Dec. 23, 1969   A. SPRUYT ET AL   3,485,362
DEVICE FOR FILTERING, SEPARATING OR AGITATING A LIQUID
MIXTURE COMPOSED OF TWO PHASES HAVING
DIFFERENT SPECIFIC GRAVITIES
Filed Jan. 19, 1965   5 Sheets-Sheet 1

United States Patent Office 3,485,362
Patented Dec. 23, 1969

3,485,362
DEVICE FOR FILTERING, SEPARATING OR AGITATING A LIQUID MIXTURE COMPOSED OF TWO PHASES HAVING DIFFERENT SPECIFIC GRAVITIES
Adriaan Spruyt and Joseph L. Matteman, Oosterbeek, and Harmen Bottinga, Arnhem, Netherlands, assignors to Reactor Centrum Nederland, The Hague, Netherlands, an institute of the Netherlands
Filed Jan. 19, 1965, Ser. No. 426,587
Claims priority, application Netherlands, Jan. 24, 1964, 6400525
Int. Cl. B04c 5/02
U.S. Cl. 209—155                                                3 Claims

ABSTRACT OF THE DISCLOSURE

A cyclone separator is connected by its apex aperture to a mass of liquid containing suspended solid particles and light component is withdrawn from the opposite end by a pump and returned tangentially to the cyclone. When light component is tapped from the withdrawn stream, additional light component enters the cyclone from the mass of suspension. The apparatus may be employed to separate fine particles or to agitate the mass of suspension.

---

The invention relates to the handling of liquid mixtures composed of at least two phases having different specific gravities. More in particular, it relates to equipment and procedures for utilizing centrifugal separators of the hydrocyclone type.

It is the primary object of the present invention to provide a hydrocyclone separator with certain auxiliary equipment which renders the separator versatile in effecting various operations such as the separation of componenst of a liquid suspension or the agitation of a suspension to maintain it homogeneous. Broadly, the invention contemplates a hydrocyclone having an aperture in its apex end communicating with a vessel for storing a suspension. The large end of the hydrocyclone is provided with a light-component outlet and with a tangential inlet, the outlet and inlet communicating by means of an auxiliary circuit to the suction side and the pressure side of a pump respectively.

It is a further object of the present invention to provide a system of the above type which operates as a filter for the continuous production of a stream of clean liquid from the mass of suspension in the vessel.

It is another object to provide a system of the above type which operates to separate two substances each having a different specific gravity but suspended in one and the same liquid.

It is another object to provide a system of the above type which operates to keep in motion a mixture of liquids or a suspension contained in the storage vessel without having to use moving parts in the vessel and without having to introduce, for example, gaseous media into the vessel for agitation purposes.

In operation of the system, a quantity of liquid containing light separable components can be tapped from the auxiliary circuit, which quantity flows via the cyclone from the suspension-filled circuit. This tapped-off quantity is only a fraction of the flow of liquid circulating in the auxiliary circuit in unit time.

The quantity of liquid that is tapped from the auxiliary circuit produces in the apex aperture a flow of liquids in the direction of the light-component outlet. When the particles carried along with this current from the suspension circuit come into the apex aperture, the rotational field that reigns in this aperture carries them away into the wall current flowing in the opposite direction and thus prevents them from penetrating the cyclone. This same mechanism is also operative in the cyclone.

This mechanism checks heavy particles more easily than light ones, so that there can at most be lighter fractions present in the auxiliary circuit.

The separating effect can be intensified by increasing the inlet velocity of the liquid entering the cyclone. In this way the system is self-cleaning in case of fouling of the auxiliary circuit by unwanted fractions.

The term "vessel" will hereinafter be understood to mean either a processing vessel or a part of a system of conduits.

If the above-mentioned device is used as a filter for material suspended in liquid, one need only connect a tapping point to the auxiliary circuit in which the above-mentioned pump is incorporated. It is found that from this auxiliary circuit it is possible to draw off clean liquid flowing via the cyclone from the aforementioned vessel. It depends upon the positioning of the cyclone how the device will act.

The cyclone may be placed erect but may also be inverted, i.e., with the apex aperture uppermost. A further possibility is to mount the cyclone in such a way that its center-line assumes a position deviating from the vertical. For instance, the cyclone may be mounted with its center-line in a horizontal position.

The device may furthermore be used for processing a liquid mixture at least two components of which consist of liquids of different specific gravities.

The device is also very serviceable as a particle separator, especially for substances of different specific gravities. Thus, if the liquid contains two suspended substances having specific gravities which are unequal to each other, it is quite possible with the device described to separate these different kinds of suspended substances from each other by tapping from the auxiliary circuit a current of liquid containing the fraction to be separated. This separation may even be effected if these suspended substances have particles which are physically adsorbed to each other. By the action of the device described, these particles are pulled away from each other and afterwards separated out.

In an embodiment in which there are both coarse and fine particles of fissile material suspended in the form of fine particles in an aqueous liquid, it is thus possible to separate the fine particles of fissile material and the fine carbon particles from the coarse particles of fissile material. In this case, instead of clean water, water charged with fine particles of fissile material and fine carbon particles is tapped from the auxiliary circuit.

Should one wish to set up agitation in the processing vessel to which the cyclone is connected, one need only take steps to maintain a pulsating current in the auxiliary circuit or to vary the current that is tapped from the auxiliary circuit and returned to the vessel. This pulsation of the current of liquid that is circulating in the auxiliary circuit may be brought about by incorporating in this circuit a valve which changes passage periodically. Another possibility is to use a pump which is so constructed that the current of liquid delivered by it has a yield characteristic with the utmost possible pulsation. A so-called dosing pump or a piston pump may be adapted for this purpose. It is found that in all these cases the agitating effect of the cyclone extends beyond the apex aperture, so that the agitation becomes noticeable in the processing vessel.

The invention will be further understood from the following detailed description taken with the drawings in which FIGURES 1–4 are in the form of diagrammatic flow sheets.

Figure 1:
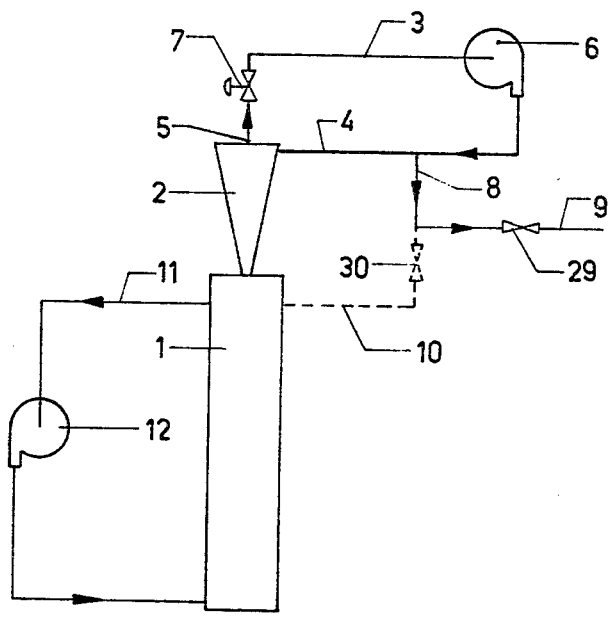
FIGURE 1 illustrates a first embodiment serving as a filter or as particle separator, using a cyclone in the normal position.

Item 1 in FIGURE 1 represents a processing vessel containing a suspension. Situated over this processing vessel is a hydrocyclone 2 which is so positioned that its apex aperture connects with the vessel. An auxiliary circuit includes a pump 6, a suction line 3 and a pressure line 4. The suction line 3 connects with the light-component outlet of the cyclone 2, and the pressure line 4 connects tangentially with the cyclone 2 at the large end thereof. The suction line includes an adjustable shut-off valve 7. A tapping conduit 8 connects with the pressure conduit 4 intermediate the ends of the latter. Liquid tapped through the conduit 8 can be discharged through a conduit 9 for possible use elsewhere or may be returned through conduit 10 to the vessel 1.

Item 11 represents a second circuit, likewise connected to vessel 1 in which a pump 12 is also incorporated.

The operation of the device described above is as follows:

Owing to the flow of liquid in the auxiliary circuit maintained by pump 6, a current with a vortex motion is produced in cyclone 2. When there is liquid in vessel 1 laden with a single suspension, the liquid in cyclone 2 remains clean. As soon as liquid is tapped through conduit 8 from the auxiliary circuit, liquid in the latter is replenished by a current of liquid derived from vessel 1. This current also is found to consist of clean liquid in which there are no suspended particles.

Various devices (not shown in the drawing), intended for operation with the suspension contained in vessel 1, may be incorporated in circuit 11.

In cases where the flow of liquid maintained by pump 12 (embodied in circuit 11) proves insufficient to ensure that no demixing takes place in vessel 1, the FIGURE 1 device may be used in different ways to prevent demixing.

Firstly, one may close the shut-off valve 29 in the discharge line 9 and open the valve 30 in the return line 10 in order that a current of liquid may be supplied to vessel 1 through the line 10. This will prevent the settling of suspended particles.

Secondly, prevention of particle setting can be effected by opening the shut-off valve 7 periodically to a greater or lesser extent. In this way a pulsating current of liquid will be set up in the auxiliary circuit, causing an agitating action to be exerted via cyclone 2 in vessel 1. This agitating action is sufficient to check demixing of the suspension.

Figure 2:
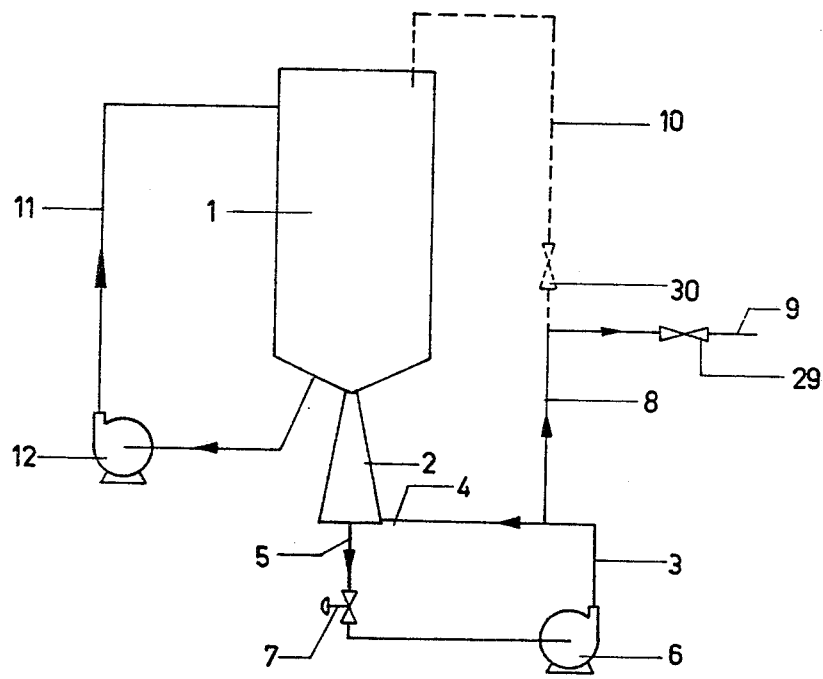
FIGURE 2 illustrates a second embodiment serving as an agitator or filter, using a cyclone in the inverted position.

In FIGURE 2 the cyclone 2 is in the inverted position, viz. with the apex upward. The plant is otherwise identical with the FIGURE 1 plant and the same reference numerals have been employed for corresponding parts of the plant.

Figure 3:
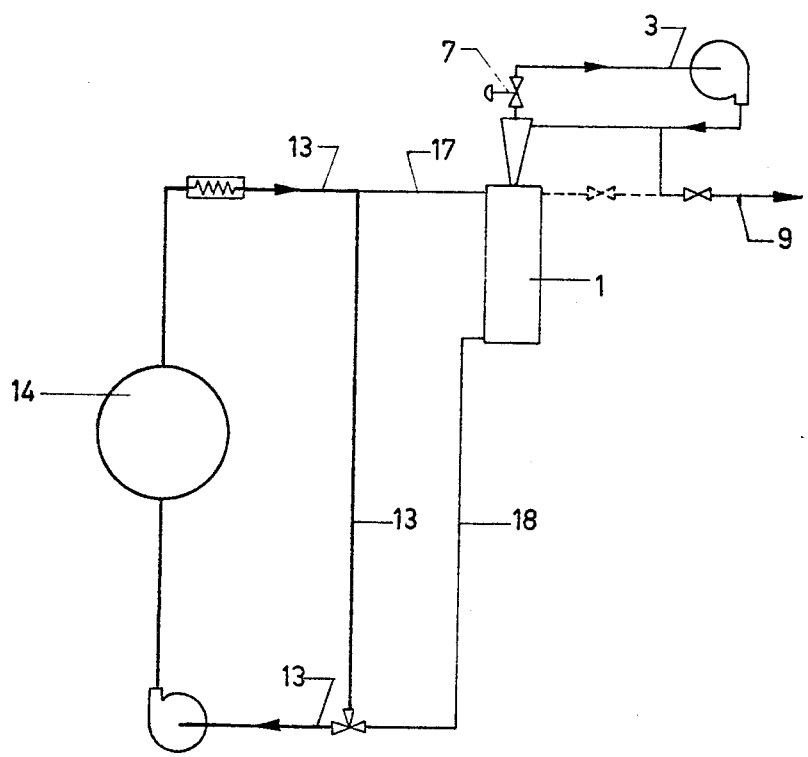
FIGURE 3 illustrates a third embodiment in the form of a particle separator in which the tap from the auxiliary circuit is used for drawing off fine carbon particles and fine particles of fissile material from a suspension circuit.

FIGURE 3 illustrates a suspension type nuclear reactor in which several suspended substances of different specific gravities are present in the suspension circuit 13, as for example particles of fissile material and fine carbon particles. With the device described it is found possible to tap off through conduit 9 a current of liquid which carries with it fine carbon particles laden with waste products. In this case vessel 1 is connected via conduits 17 and 18 to the suspension circuit 13.

By causing a part of the suspension that is returning externally to the reactor vessel 14 to be conveyed through the vessel 1 by means of these conduits 17 and 18, the suspension is continuously freed from carbon particles laden with waste products and from any unwanted fine particles of fissile material.

Figure 4:
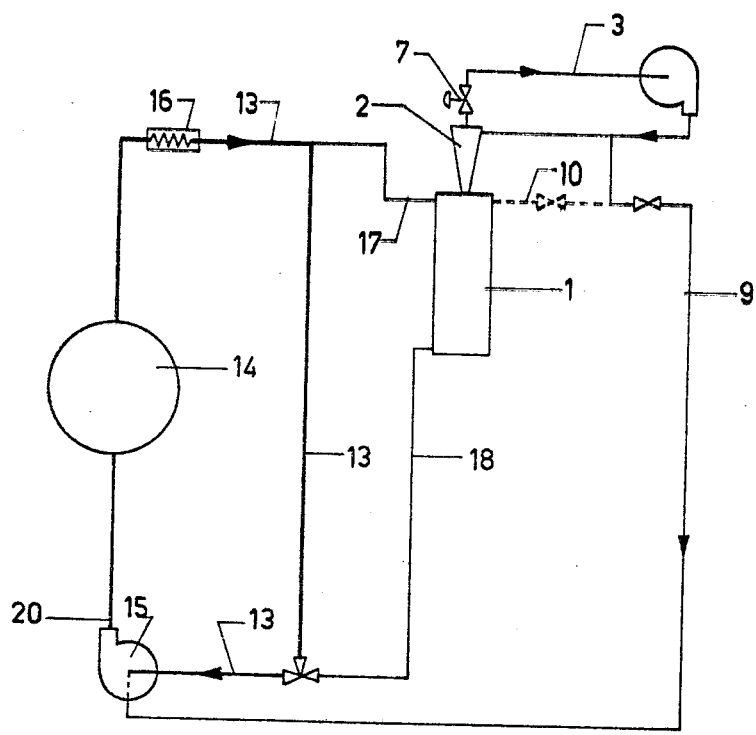
FIGURE 4 illustrates a fourth embodiment serving as a filter in combination with a suspension-type nuclear reactor.

FIGURE 4 illustrates a nuclear reactor 14 operating with a suspension of particles of fissile material in an aqueous liquid. As in the foregoing figures, item 1 again represents the vessel or part of a conduit through which suspended particles of fissile material flow. The cyclone 2 is mounted on top of this vessel. The suspension of fissile material is circulated through the nuclear reactor 14 and through the heat exchanger 16 by the pump 15. The heat exchanger serves to dissipate the heat developed in the reactor. The reactor circuit is connected to vessel 1 via the communicating conduits 17 and 18. Here again, liquid can be tapped from the auxiliary circuit through the tapping conduit 9. If the suspension contained in the reactor circuit 13 is a simple suspension and thus consists solely of particles of fissile material suspended in an aqueous liquid, it will be possible with the device described to withdraw clean liquid from the suspension via conduit 9.

Figure 5:
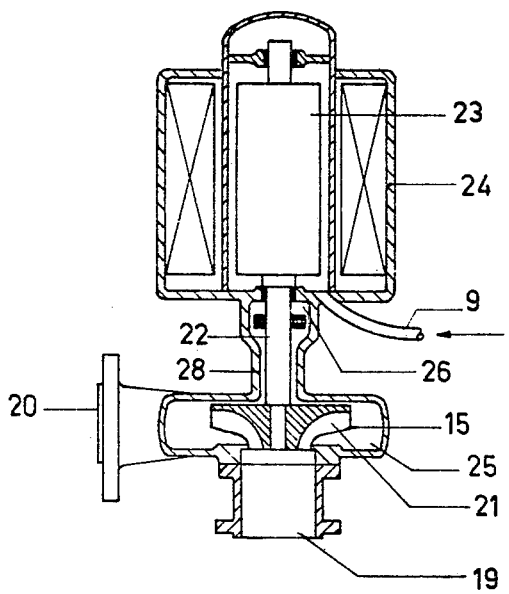
FIGURE 5 is longitudinal sectional view of the circulation pump of the suspension circuit of FIGURE 4.

This clean liquid may be used, for instance, to ensure that in the circulation pump 15 there is no penetration of suspension particles into the motor section via the connection between the motor section and the pump section. This is made clear in FIGURE 5. This centrifugal pump 15 has an inlet 19 and an outlet 20. In the interior of the pump chamber there is a pump impeller 21 fitted to a shaft 22. This shaft is driven by the rotor 23 of an enclosed electric motor in such a way that the shaft connecting the pump impeller 21 and the rotor 23 does not at any point pass outside the walls of the enclosure 24. Between the pump chamber 25 and the chamber 26 connecting with the electric motor there is a communicating chamber serving as a shaft duct 28. The duct 28 is at the same time connected to conduit 9. Passing from the auxiliary circuit, the current of clean water entering through conduit 9 is conveyed via the communicating chamber 28 to the pump section, thus ensuring that the suspension contained in the pump chamber 25 cannot penetrate into the motor chamber. This would result in damage to the bearings and other parts.

Such damage is prevented by the method outlined above without the necessity of using flushing liquid produced by an evaporator or sedimentation vessels or obtained from sources outside the suspension circuit. The latter method would not be feasible in practice, as the quantity of liquid contained in the suspension circuit would steadily increase. At best, this could be done theoretically by draining off the suspension liquid again at a different point in the suspension circuit. In view, however, of the radioactive character of the suspension liquid, such draining-off is not permissible. The particle-free water must therefore be produced internally.

What is claimed is:

1. A method for the separation from each other of particles having different specific gravities, which particles are in the form of a suspension in a carrier liquid, said method comprising: providing a zone having an apex aperture and a light component outlet at the opposite end of said zone; placing said apex aperture in communication with a mass of the suspension; providing a spiral flow of carrier liquid within said zone by removing a stream of light component from said light component outlet and returning a major portion of said stream to said zone tangentially to said zone at the end thereof opposite said apex aperture wherein the stream of light component consists of the finer particles suspended in carrier liquid; and tapping a minor portion of said stream of light component thereby removing from said stream a suspension of the finer particles in said carrier liquid, said tapped portion being of sufficient quantity to cause flow of a suspension of finer particles in carrier liquid from said mass of suspension through said apex aperture into said zone while leaving the heavier particles in said mass of suspension.

2. A method of agitating a mass of solid particles suspended in a liquid contained in a vessel comprising: providing a zone having an apex aperture and a light component outlet at the opposite end of said zone; placing said apex aperture in communication with said vessel; providing a spiral flow of carrier liquid within said zone by removing a stream of light component from said light component outlet and returning a major portion of said stream to said zone tangentially thereto at the end opposite said apex aperture wherein the stream of light component consists of carrier liquid free of solid particles; tapping a portion of said stream of light component, said tapped portion being of sufficient quantity to cause flow of liquid from said mass of suspension through said apex aperture into said zone while leaving the solid particles in said mass of suspension; and returning the tapped portion of said stream to said vessel in a manner to agitate the mass of solid particles suspended therein.

3. A method according to claim 2 wherein said tapped portion of liquid is introduced tangentially into said vessel.

References Cited

UNITED STATES PATENTS

| | | | |
|---|---|---|---|
| 2,419,275 | 4/1947 | Metzger | 210—196 X |
| 2,649,963 | 8/1953 | Fontein | 209—211 |
| 2,754,968 | 7/1956 | Vegter et al. | 210—196 |
| 2,794,832 | 6/1957 | Rietma | 210—512 X |
| 2,981,413 | 4/1961 | Fitch | 210—512 X |
| 3,101,313 | 8/1963 | Woodruff | 209—211 |
| 3,130,157 | 4/1964 | Kelsall et al. | 210—512 |
| 3,166,496 | 1/1965 | Kelsall | 210—512 X |
| 3,251,468 | 5/1966 | Muller | 210—196 X |
| 3,347,372 | 10/1967 | Bouchillon | 209—211 |

FOREIGN PATENTS 972,885 10/1959 Germany.

SAMIH N. ZAHARNA, Primary Examiner

W. S. BRADBURY, Assistant Examiner

U.S. Cl. X.R.

209—211; 210—19, 84, 512, 195